V. P. ALEXANDER.
WORK CLAMP.
APPLICATION FILED OCT. 25, 1919.
1,351,148. Patented Aug. 31, 1920.
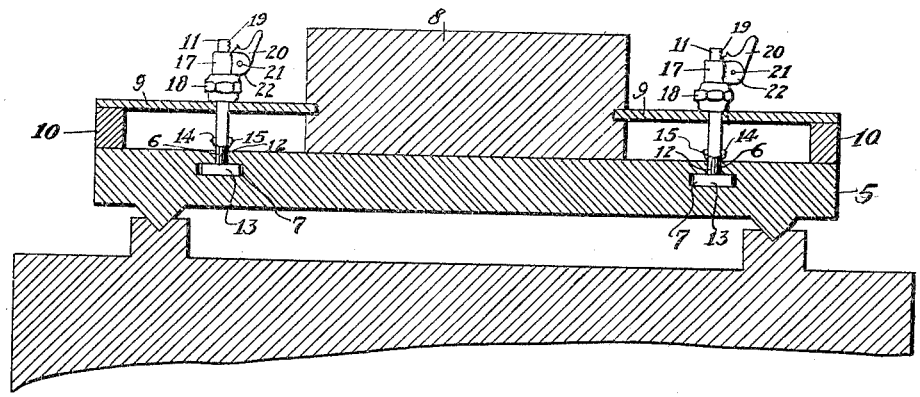
Fig.1.
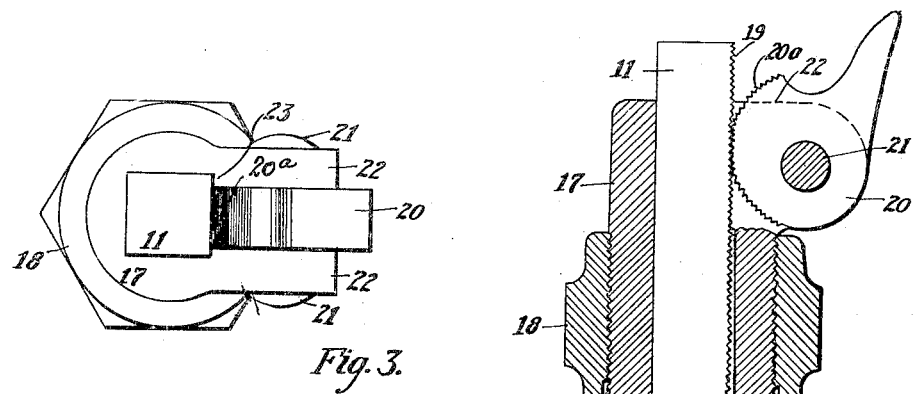
Fig.3.
Fig.2.
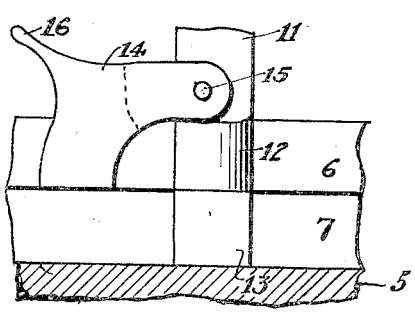
Fig.4.
Inventor
Verne P. Alexander
By
Attorneys

UNITED STATES PATENT OFFICE.

VERNE P. ALEXANDER, OF CHICAGO, ILLINOIS.

WORK-CLAMP.

1,351,148.

Specification of Letters Patent.  Patented Aug. 31, 1920.

Application filed October 25, 1919. Serial No. 333,164.

*To all whom it may concern:*

Be it known that I, VERNE P. ALEXANDER, a citizen of the United States, residing at Chicago, in the county of Cook and State of Illinois, have invented new and useful Improvements in Work-Clamps, of which the following is a specification.

This invention relates to devices used in connection with planers, shapers and similar metal-working machines for securing the work on the bed or table thereof, the object of the invention being to provide a simple, efficient and quick-acting device of this kind.

The object stated is attained by means of a novel combination and arrangement of parts to be hereinafter described and claimed, and in order that the same may be better understood, reference is had to the accompanying drawings forming a part of this specification.

In the drawing,

Figure 1 is a sectional view showing the application of the invention;

Fig. 2 is an elevation of the device, partly in section;

Fig. 3 is a plan view thereof, and

Fig. 4 is an elevation showing a latch device.

Referring specifically to the drawing, 5 denotes the work-supporting bed or table of the machine, the same being provided with parallel, longitudinal grooves 6 which are undercut as shown at 7, or T-shaped, as usual. The work, denoted at 8, is held down on the bed by two clamping bars 9 which are stuck into the work on opposite sides thereof, with their outer ends resting on blocks 10 seating on the bed. The clamping bars are drawn down to firmly hold the work to the bed, by the bolts of novel and improved design, a clamping bolt being provided for each bar, and as the bolts are alike, a description of one suffices for both.

The main portion of the shank 11 of the bolt is of square or other angular cross-section, and adjacent to the head, the shank is of circular cross section, this portion of the bolt being denoted by the reference character 12. The head 13 of the bolt is in T-form. When the bolt is in place, the head 13 seats transversely in the wide bottom portion 7 of the groove, and the round portion 12 of the shank seats in the narrow top portion 6 of the groove. The bolt can therefore be rotated to bring the T-head into alinement with the part 6 of the groove, after which it can be removed. The bolt is inserted in a similar manner, and then given a quarter turn to place the T-head transversely of the portion 7 of the groove, so that it now cannot be pulled upwardly out of the groove, it being however free to slide therein in the direction of its length. The bolt can therefore be placed into the groove without going to the end of the bed and inserting it where the groove opens through said end.

In order to prevent the bolt from turning in the groove, a pivoted latch device 14 is provided, the same being pivoted to the bolt as shown at 15, to project from one side thereof. The extremity of this device is downturned so that it may drop into the portion 6 of the groove, and a finger piece 16 is provided to facilitate lifting the device out of the groove, after which the bolt can be turned as hereinbefore described.

On the angular portion 11 of the bolt shank is slidably mounted a sleeve 17 having its inner end externally screw-threaded to hold a nut 18. One side of this portion of the bolt shank is formed with rack teeth 19 engageable by a cam locking member 20, which latter is pivoted, as shown at 21, between ears or wings 22 projecting from the sleeve at the outer end thereof. The edge of the cam-member which is engageable with the rack 19 is also toothed or serrated as shown at $20^a$ to interlock with the rack teeth.

In order that the device may be adaptable to bolts of various widths, within certain limits, without necessitating the alteration or replacement of parts, the bore of the sleeve 17 is made of greater width than the space between the wings 22. Thus, the insertion of a smaller bolt than that shown, would only require the cam locking member to be advanced slightly further for proper engagement with the bolt.

In use the bolt is manipulated to locate its head 13 in the portion 7 of the groove 6, the shank of the bolt, minus the sleeve 17, being also passed through a bolt hole in the clamping bar 9. The sleeve 17, with the nut 18 in place thereof, is then slipped down the portion 11 of the bolt shank until their inner ends seat on the bar 9, it being understood, of course, that the cam member 20 must first be swung to leave the sleeve free on the bolt shank. The cam member is now swung to jam its serrated edge 20ª against the rack 19, whereby the sleeve is securely locked on the bolt shank, and then a few turns of the nut 18 to bring it firmly down on the bar 9, suffices to secure the latter in position to hold the work 8.

By the device hereinbefore described the work can be quickly secured in place to be operated on by the machine, and after the job is finished, the work can be easily and quickly removed.

I claim:

1. A clamping device comprising a headed shank, a sleeve slidably mounted on the shank, means for locking the sleeve to the shank, and a nut threaded on the sleeve and located opposite the base of the head.

2. A clamping device comprising a headed shank, a sleeve slidably mounted on the shank, a pivoted cam clamping member carried by the sleeve and engageable with the side of the shank for locking the sleeve to the same, and a nut threaded on the sleeve and located opposite the base of the head.

3. A clamping device comprising a headed shank, a sleeve slidably mounted on the shank, a pivoted cam clamping member carried by the sleeve and engageable with the side of the shank for locking the sleeve to the same, said side of the shank having rack teeth, and the shank engaging portion of the clamping member having corresponding teeth, and a nut threaded on the sleeve and located opposite the base of the head.

4. A clamping device comprising a shank having a T-shaped head adapted to enter an undercut groove, a latch member pivoted to the side of the shank and adapted to enter said groove to prevent rotation of the shank and its head, a sleeve slidably mounted on the shank, means for locking the sleeve to the shank, and a nut threaded on the sleeve and located opposite the base of the head.

In testimony whereof I affix my signature.

VERNE P. ALEXANDER.